United States Patent
Ito et al.

(10) Patent No.: US 10,601,261 B2
(45) Date of Patent: Mar. 24, 2020

(54) PORTABLE ELECTRONIC DEVICE, METHOD, AND COMPUTER-READABLE RECORDING MEDIUM

(71) Applicant: KYOCERA Corporation, Kyoto-shi, Kyoto (JP)

(72) Inventors: Takashi Ito, Kyoto (JP); Yu Nishino, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 219 days.

(21) Appl. No.: 15/444,074

(22) Filed: Feb. 27, 2017

(65) Prior Publication Data
US 2017/0170680 A1    Jun. 15, 2017

Related U.S. Application Data

(62) Division of application No. 13/686,666, filed on Nov. 27, 2012, now Pat. No. 9,620,973.

(30) Foreign Application Priority Data

Nov. 28, 2011    (JP) .................................. 2011-259292

(51) Int. Cl.
  *H02J 50/80*    (2016.01)
  *H02J 50/40*    (2016.01)
  (Continued)

(52) U.S. Cl.
  CPC ............ *H02J 50/80* (2016.02); *H02J 7/0044* (2013.01); *H02J 7/027* (2013.01); *H02J 50/10* (2016.02);
  (Continued)

(58) Field of Classification Search
  CPC .................................. H02J 50/80; H02J 7/027
  USPC ........................................................ 320/108
  See application file for complete search history.

(56) References Cited

U.S. PATENT DOCUMENTS 6,729,550 B2    5/2004 Seita et al.
8,427,541 B2    4/2013 Ono
(Continued)

FOREIGN PATENT DOCUMENTS

JP    9-83426 A    3/1997
JP    2003-16398 A    1/2003
(Continued)

OTHER PUBLICATIONS

Office Action in JP Application No. 2011-259292, dated Sep. 15, 2015.

*Primary Examiner* — Richard V Muralidar
(74) *Attorney, Agent, or Firm* — Hauptman Ham, LLP

(57) ABSTRACT

An object of the present invention is to provide a portable electronic device, a method, and a computer-readable recording medium, all of which are capable of preventing the portable electronic device from being taken away by another person while charging. The smartphone includes: a touch-screen display; a power receiving unit that receives power from electromagnetic waves that are supplied from a battery charger; and a controller that restricts execution of predetermined functions in a case in which the portable electronic device is separated from the battery charger in a state where the battery charger is supplying electromagnetic waves to the power receiving unit, and enables the predetermined functions to be executed in a case in which an authentication operation is performed via the touch-screen display after restricting execution of the predetermined functions.

9 Claims, 7 Drawing Sheets

(51) Int. Cl.
    *H02J 7/00*          (2006.01)
    *H02J 50/10*        (2016.01)
    *H02J 50/90*        (2016.01)
    *H04M 1/67*         (2006.01)
    *H02J 7/02*          (2016.01)
    *H02J 5/00*          (2016.01)

(52) U.S. Cl.
    CPC .............. *H02J 50/40* (2016.02); *H02J 50/90* (2016.02); *H04M 1/67* (2013.01); *H02J 5/005* (2013.01); *H02J 2007/0001* (2013.01)

(56) References Cited

U.S. PATENT DOCUMENTS

| | | | |
|---|---|---|---|
| 9,620,973 B2 * | 4/2017 | Ito | H02J 7/0044 |
| 2003/0006280 A1 | 1/2003 | Seita et al. | |
| 2012/0043932 A1 * | 2/2012 | Nakama | H02J 7/0004 320/108 |
| 2012/0146576 A1 * | 6/2012 | Partovi | H02J 50/12 320/108 |
| 2012/0290939 A1 | 11/2012 | Yu et al. | |
| 2015/0257125 A1 * | 9/2015 | Iwamoto | H04W 68/00 455/414.1 |

FOREIGN PATENT DOCUMENTS

| | | |
|---|---|---|
| JP | 2006-295826 A | 10/2006 |
| JP | 2007-174163 A | 7/2007 |
| JP | 2009-213312 A | 9/2009 |
| JP | 2010-98356 A | 4/2010 |
| JP | 2010-268609 A | 11/2010 |
| JP | 2011-39970 A | 2/2011 |
| JP | 2011-151467 A | 8/2011 |
| WO | 2008/086302 A1 | 7/2008 |

\* cited by examiner

PORTABLE ELECTRONIC DEVICE, METHOD, AND COMPUTER-READABLE RECORDING MEDIUM

This application is a division of U.S. patent application Ser. No. 13/686,666 filed on Nov. 27, 2012, which is based on and claims the benefit of priority from Japanese Patent Application No. 2011-259292 filed on Nov. 28, 2011, the entire contents of which are incorporated herein by reference.

BACKGROUND OF THE INVENTION

Field of the Invention

The present invention relates to a portable electronic device, a method, and a computer-readable recording medium. In particular, the present invention relates to a device having a touch-screen display, a method for controlling the portable electronic device, and a computer-readable recording medium for controlling the portable electronic device.

Related Art

A portable electronic device including a touch-screen display has been known. Examples of the portable electronic device including the touch-screen display include, for example, a smartphone and a tablet. The portable electronic device including the touch-screen display detects gestures of a finger or a stylus pen via the touch-screen display. The portable electronic device including the touch-screen display is operated in accordance with the gestures thus detected. Examples of operations in accordance with detected gestures are disclosed in, for example, PCT International Publication, No. WO 2008/086302.

Basic operations of a portable electronic device including a touch-screen display are implemented by an OS (Operating System) such as Android (registered trademark), BlackBerry (registered trademark) OS, Symbian (registered trademark) OS, iOS, Windows (registered trademark) Phone, etc. installed in the portable electronic device.

SUMMARY OF THE INVENTION

Incidentally, contactless charge without having an electric contact with a battery charger by utilizing electromagnetic induction has been proposed for such a portable electronic device. A remaining level of a battery of such a device is likely to be reduced by browsing moving images, etc. in public places.

Accordingly, in public places such as stores, some battery chargers are made available for users. However, in a case in which a portable electronic device is charged by being placed on a battery charger provided in a public place, the portable electronic device may be taken away by another person.

An object of the present invention is to provide a portable electronic device, a method, and a computer-readable recording medium, all of which are capable of preventing the portable electronic device from being taken away by another person while charging.

A portable electronic device according to the present invention includes an operation unit, a power receiving unit, and a control unit. The power receiving unit receives power from electromagnetic waves that are supplied from a battery charger. The control unit restricts execution of predetermined functions in a case in which the portable electronic device is separated from the battery charger in a state where the battery charger is supplying electromagnetic waves to the power receiving unit. The control unit enables the predetermined functions to be executed in a case in which an authentication operation is performed via the operation unit after restricting execution of the predetermined functions.

In the portable electronic device according to the present invention, in a state where a battery charger is supplying electromagnetic waves to the power receiving unit, it is preferable for the control unit to determine whether the battery charger is a predetermined battery charger. In a case in which the battery charger is determined to be the predetermined battery charger, when the portable electronic device is separated from the battery charger, it is preferable for control unit to restrict execution of the predetermined functions, and to accept the authentication operation.

It is preferable for the portable electronic device according to the present invention to further include a notification unit. It is preferable for the control unit to cause the notification unit to make a notification, in a case in which an authentication operation is not performed within a predetermined period of time after restricting execution of the predetermined functions.

It is preferable for the portable electronic device according to the present invention to further include a vibration unit that vibrates the portable electronic device. It is preferable for the control unit to suspend a vibrating function of the vibrating unit, in a state where a battery charger is supplying electromagnetic waves to the power receiving unit.

It is preferable for the portable electronic device according to the present invention to further include a display unit. In a state where a battery charger is supplying electromagnetic waves to the power receiving unit, in a case in which the portable electronic device is separated from the battery charger, it is preferable for the control unit to cause the display unit to display the predetermined period of time.

In the portable electronic device according to the present invention, in a state where a battery charger is supplying electromagnetic waves to the power receiving unit, when the portable electronic device is separated from the battery charger, it is preferable for the control unit to cause the display unit to display countdown for the predetermined period of time as an initial value.

In the portable electronic device according to the present invention, in a case in which a battery charger starts supplying electromagnetic waves to the power receiving unit while the countdown is being displayed, it is preferable for the control unit to suspend the displaying of the countdown.

In the portable electronic device according to the present invention, in a case in which the portable electronic device is separated from the battery charger after suspending the displaying of the countdown, it is preferable for the control unit to cause the display unit to display countdown for the predetermined period of time as an initial value.

The portable electronic device according to the present invention includes: an operation unit; a notification unit; a power receiving unit that receives power from electromagnetic waves that are supplied from a battery charger; and a control unit that causes the notification unit to make a notification, in a case in which the portable electronic device is separated from the battery charger, in a state where the battery charger is supplying electromagnetic waves to the power receiving unit.

In the portable electronic device according to the present invention, in a state where a battery charger is supplying electromagnetic waves to the power receiving unit, it is preferable for the control unit to accept an authentication operation via the operation unit.

It is preferable for the portable electronic device according to the present invention to further include an acceleration sensor. It is preferable for the control unit to detect that the portable electronic device is separated from the battery charger, based on acceleration detected by the acceleration sensor.

In the portable electronic device according to the present invention, it is preferable for the control unit to detect that the portable electronic device is separated from the battery charger, by detecting that electromagnetic waves are no longer supplied.

It is preferable for the portable electronic device according to the present invention to further include a position identification unit that identifies a position of the portable electronic device. It is preferable for the control unit to detect that the portable electronic device is separated from the battery charger, based on the position identified by the position identification unit.

A method according to the present invention is a method for controlling a portable electronic device. The method includes the steps of: receiving power from electromagnetic waves that are supplied from a battery charger; restricting execution of predetermined functions, in a case in which the portable electronic device is separated from the battery charger, in a state where the battery charger is supplying electromagnetic waves; and enabling the predetermined functions, in a case in which an authentication operation is performed via an operation unit after restricting execution of the predetermined functions.

A computer-readable recording medium according to the present invention is a computer-readable recording medium that stores a program for controlling a portable electronic device. The program causes the portable electronic device to execute the steps of: receiving power from electromagnetic waves that are supplied from a battery charger; restricting execution of predetermined functions, in a case in which the portable electronic device is separated from the battery charger, in a state where the battery charger is supplying electromagnetic waves; and enabling the predetermined functions, in a case in which an authentication operation is performed via an operation unit after restricting execution of the predetermined functions.

According to the present invention, it is possible to prevent a portable electronic device from being taken away by another person while charging.

DETAILED DESCRIPTION OF THE INVENTION

An embodiment for carrying out the present invention is described in detail with reference to the drawings. A smartphone is hereinafter described as an example of a portable electronic device.

Embodiment

Figure 1:
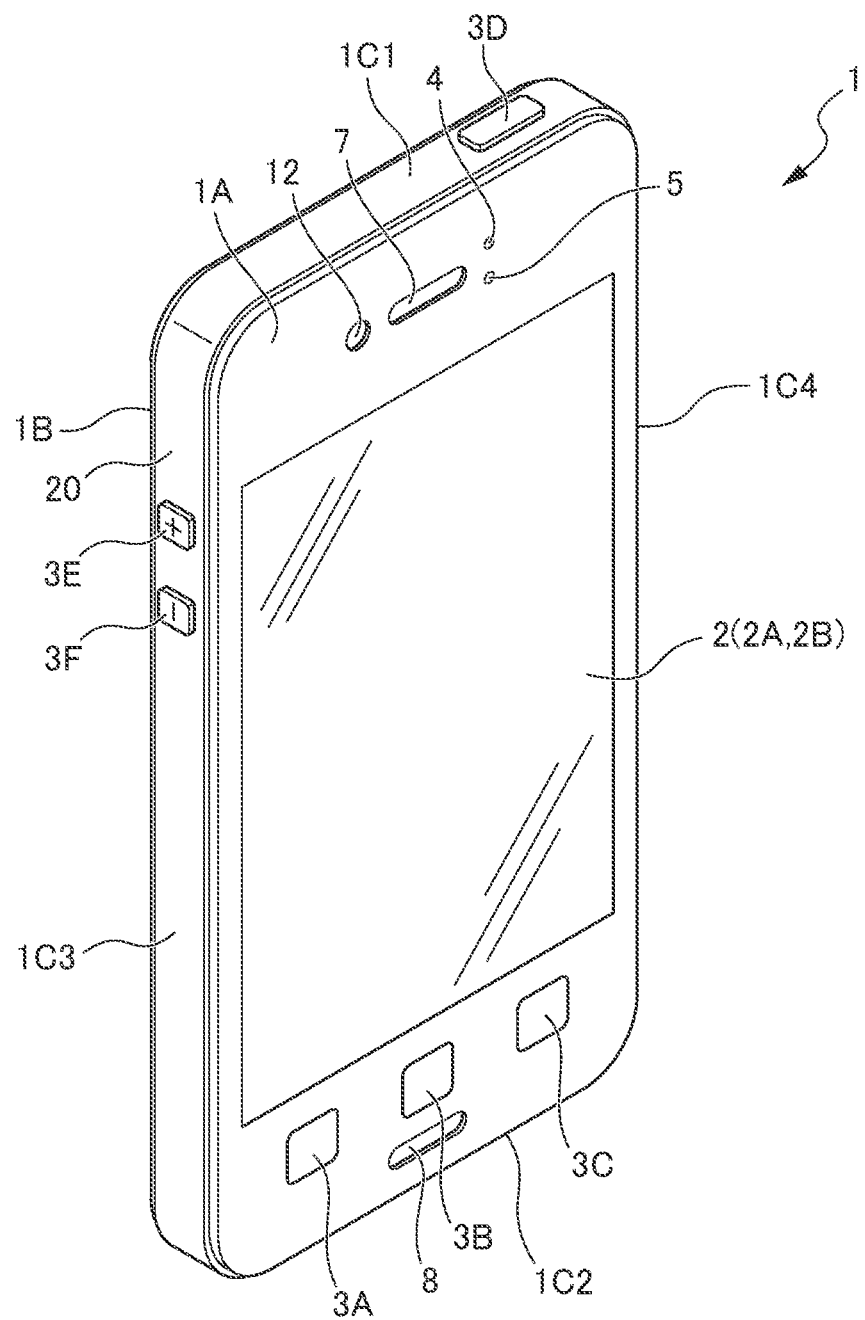
FIG. 1 is a perspective view showing an external appearance of a smartphone according to an embodiment.
Figure 2:
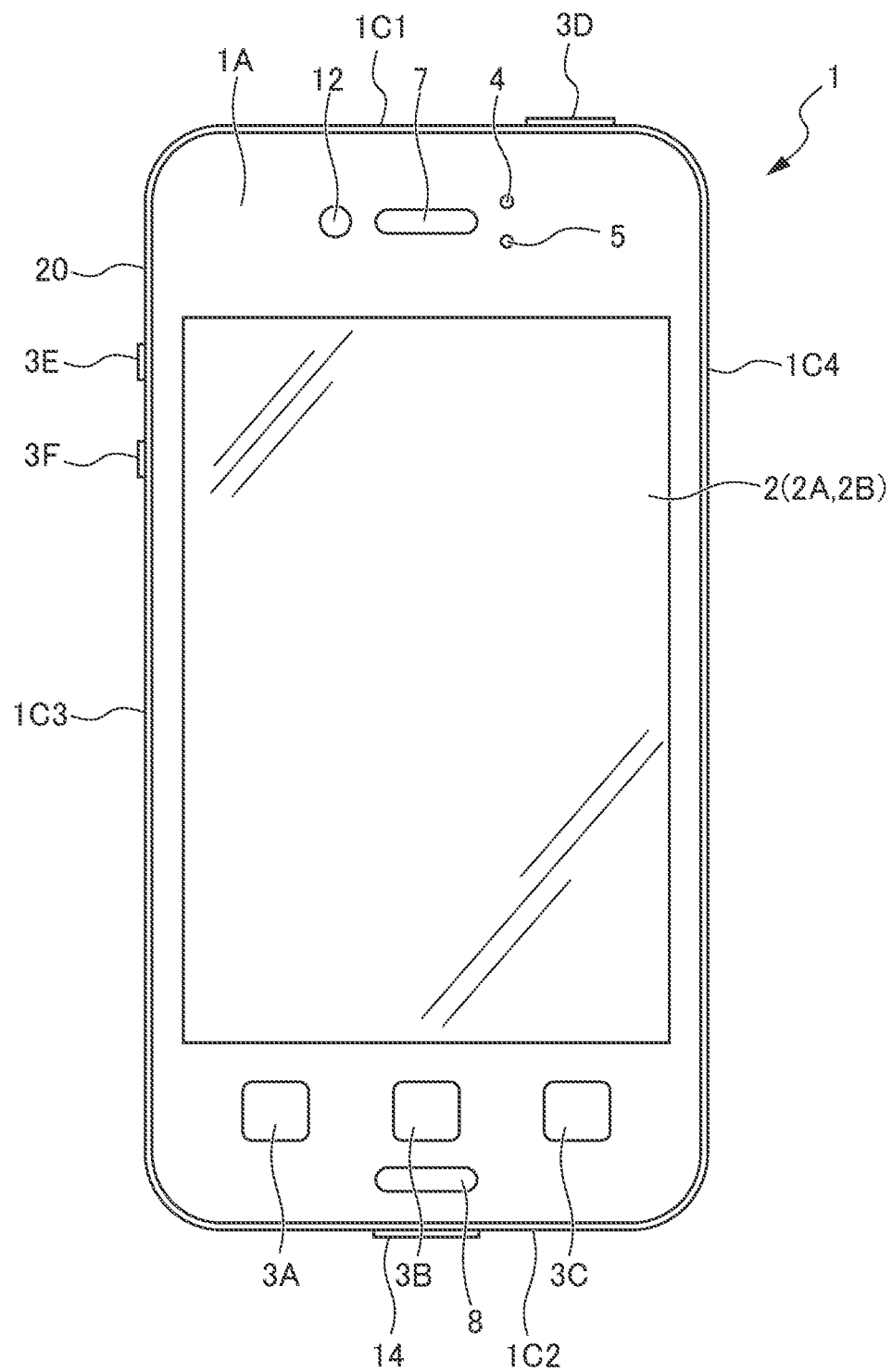
FIG. 2 is a front view showing the external appearance of the smartphone according to the embodiment.
Figure 3:
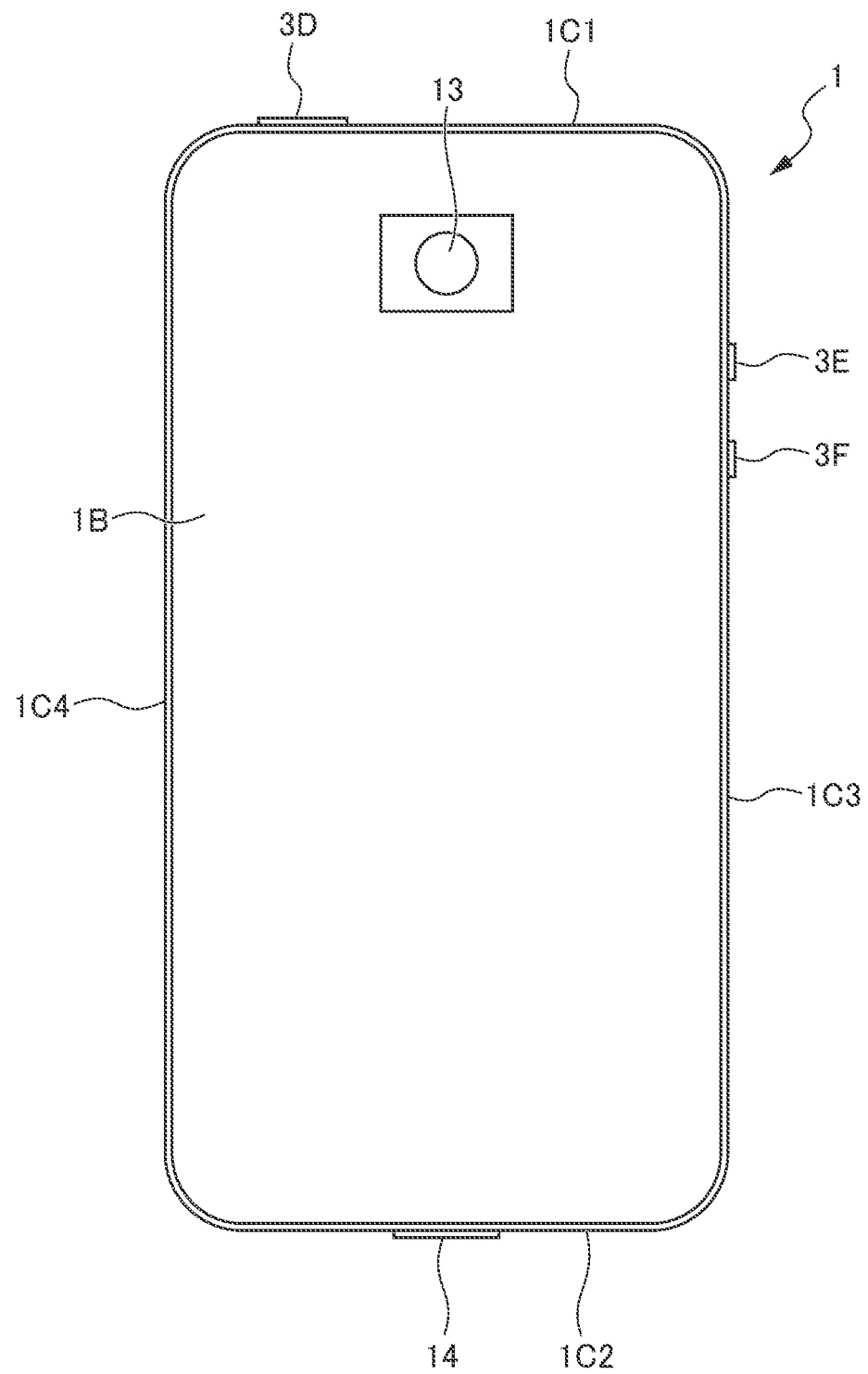
FIG. 3 is rear view showing the external appearance of the smartphone according to the embodiment.

Descriptions are provided for an external appearance of a smartphone 1 according to the embodiment with reference to FIGS. 1 to 3. As shown in FIGS. 1 to 3, the smartphone 1 has a housing 20. The housing 20 has a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. In the following descriptions, the side faces 1C1 to 1C4 may be collectively referred to as a side face 1C without specifying which face.

On the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 has a display 2A and a touch screen 2B. The display 2A includes a display device such as a liquid crystal display, an organic electro-luminescence panel, or an inorganic electro-luminescence panel. The display 2A displays characters, images, symbols, graphics or the like.

The touch screen 2B detects a touch by a finger, a stylus pen or the like to the touch-screen display 2. The touch screen 2B detects a position where a plurality of fingers, the stylus pen or the like touch the touch-screen display 2.

A detection method for the touch screen 2B may be any method such as a capacitive sensing method, a resistor film method, a surface acoustic wave method (or an ultrasonic sensing method), an infrared ray method, and an electro-magnetic induction method. In the following, for the purpose of simplifying descriptions, the fingers, the stylus pen or the like may be simply referred to as a "finger", a touch by which to the touch-screen display 2 is detected by the touch screen 2B.

The smartphone 1 distinguishes a type of a gesture, based on a touch(s), a touched position(s), a touching period of time, or a touching number of times, detected by the touch screen 2B. The gesture is an operation that is performed on the touch-screen display 2. Gestures that are distinguished by the smartphone 1 include a touch, a long touch, a release, a swipe, a tap, a double tap, a long tap, a drag, a flick, a pinch-in, a pinch-out, and the like.

The touch is a gesture of a finger to touch the touch-screen display 2 (for example, to a surface thereof). The smartphone 1 distinguishes the gesture of a finger touching the touch-screen display 2 as a touch. The long touch is a gesture of a finger touching the touch-screen display 2 for more than a certain period of time. The smartphone 1 distinguishes the gesture of a finger touching the touch-screen display 2 for more than a certain period of time as a long touch.

The release is a gesture of a finger being released from the touch-screen display 2. The smartphone 1 distinguishes the gesture of a finger being released from the touch-screen display 2 as a release. The swipe is a gesture of a finger moving while touching the touch-screen display 2. The smartphone 1 distinguishes the gesture of a finger moving while touching the touch-screen display 2 as a swipe.

The tap is a consecutive gesture of touch and release. The smartphone 1 distinguishes the consecutive gesture of touch and release as a tap. The double tap is a gesture of repeating a consecutive gesture of touch and release two times. The smartphone 1 distinguishes the gesture of repeating a consecutive gesture of touch and release two times as a double tap.

The long tap is a consecutive gesture of a long touch and release. The smartphone 1 distinguishes the consecutive gesture of a long touch and release as a long tap. The drag is a gesture of swiping from a starting point where a movable object is displayed. The smartphone 1 distinguishes the gesture of swiping from a starting point where a movable object is displayed as a drag.

The flick is a consecutive gesture of touch and release of a finger moving at a high-speed in one direction. The smartphone 1 distinguishes the gesture of touch and release of a finger moving at a high-speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; and the like.

The pinch-in is a gesture of a plurality of fingers swiping in mutually approaching directions. The smartphone 1 distinguishes the gesture of a plurality of fingers swiping in mutually approaching directions as a pinch-in. The pinch-out is a gesture of a plurality of fingers swiping in mutually receding directions. The smartphone 1 distinguishes the gesture of a plurality of fingers swiping in mutually receding directions as a pinch-out.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on a screen that is displayed on the touch-screen display 2.

Figure 4:
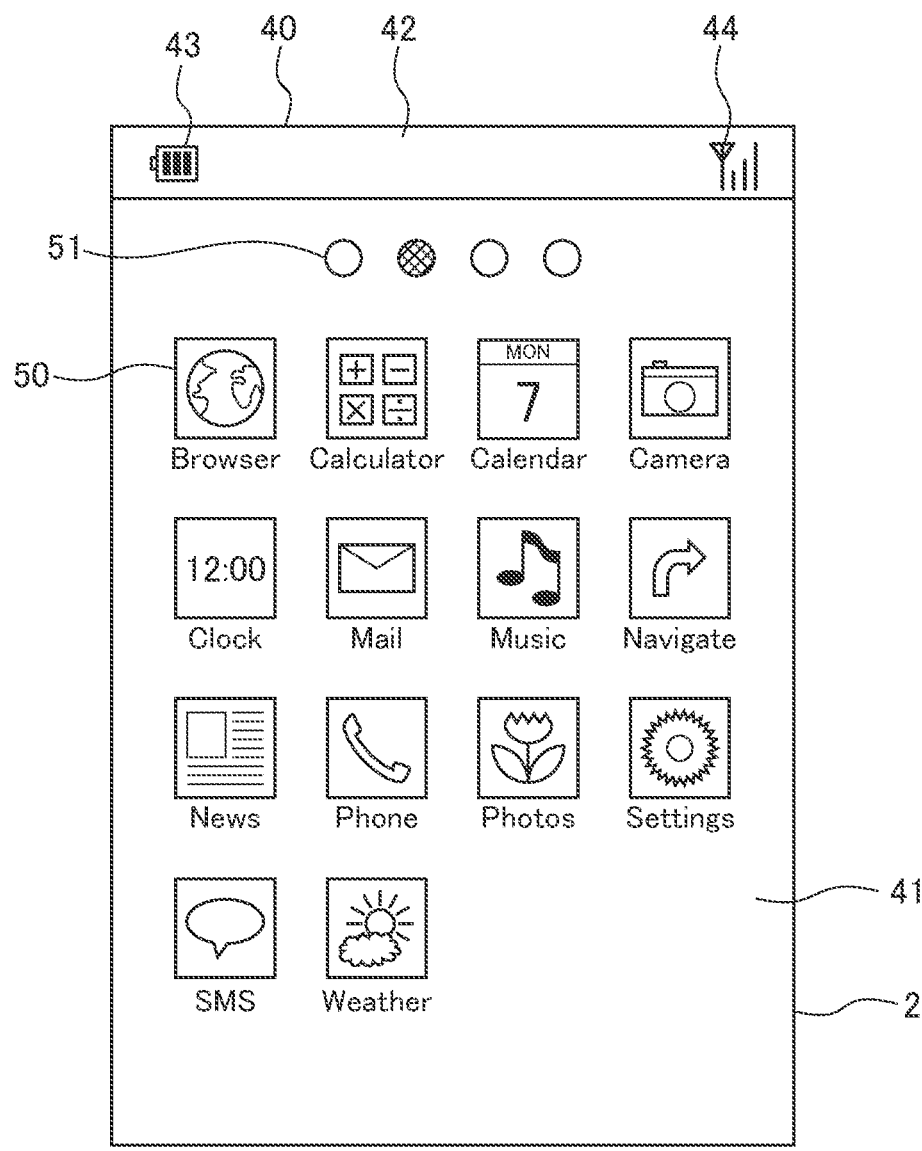
FIG. 4 is a diagram showing an example of a home screen.

An example of a screen displayed on the display 2A is described with reference to FIG. 4. FIG. 4 shows an example of a home screen. The home screen may be called a desktop or an idle screen. The home screen is displayed on the display 2A. The home screen is a screen for allowing the user to select which application to be executed among applications installed in the smartphone 1. When an application is selected in the home screen, the smartphone 1 executes the application in the foreground. The screen of the application executed in the foreground is displayed on the display 2A.

The smartphone 1 can arrange icons in the home screen. A plurality of icons 50 are arranged in the home screen 40 shown in FIG. 4. The icons 50 are previously associated with the applications installed in the smartphone 1, respectively. When the smartphone 1 detects a gesture on an icon 50, an application associated with the icon 50 is executed. For example, when the smartphone 1 detects a tap on an icon 50 associated with a mail application, the mail application is executed. Here, for example, the smartphone 1 interprets the gesture on a position (area), which corresponds to a display position (area) of the icon 50 on the touch-screen display 2, as an instruction to execute an application associated with the icon 50.

The icon 50 includes an image and a character string. The icon 50 may include a symbol or graphics in place of the image. The icon 50 may not include any one of the image or the character string. The icons 50 are arranged in accordance with a predetermined rule. A wall paper 41 is displayed behind the icons 50. The wall paper may also be called a photo screen or a back screen. The smartphone 1 can use an arbitrary image as the wall paper 41. An arbitrary image is determined as the wall paper 41, for example, in accordance with the setting by the user.

The smartphone 1 can increase and decrease the number of home screens. The smartphone 1 determines the number of home screens, for example, in accordance with the setting by the user. Even in a case in which there are a plurality of home screens, the smartphone 1 selects a single home screen from the plurality of home screens, and displays the single home screen on the display 2A.

The smartphone 1 displays one or more locators on the home screen. The number of the locators coincides with the number of the home screens. The locator indicates the position of the currently displayed home screen. The locator corresponding to the currently displayed home screen is displayed in a manner different from the other locators.

Four locators 51 are displayed in the example shown in FIG. 4. This indicates that there are four home screens 40. In the example shown in FIG. 4, the second symbol (locator) from the left is displayed in a manner different from the other symbols (locators). This indicates that the second home screen from the left is currently displayed.

When the smartphone 1 detects a particular gesture while displaying the home screen, the home screen displayed on the display 2A is switched. For example, when the smartphone 1 detects a rightward flick, the home screen displayed on the display 2A is switched over to a next home screen to the left. When the smartphone 1 detects a leftward flick, the home screen displayed on the display 2A is switched over to a next home screen to the right.

An area 42 is provided at the top edge of the display 2A. A remaining-level mark 43 indicating a remaining level of the rechargeable battery, and a radio wave level mark 44 indicating field intensity of radio waves for communication are displayed in the area 42. In the area 42, the smartphone 1 may display current time, weather information, active applications, a type of communication system, a telephone status, a device mode, events occurred to the device, etc. In this way, the area 42 is used for making various notifications to the user. The area 42 may be provided as another screen separate from the home screen 40. The position of providing the area 42 is not limited to the top edge of the display 2A.

The home screen 40 shown in FIG. 4 is an example, and shapes of various elements, layouts of various elements, the number of home screens 40, and the manner of various operations on the home screen 40 may not be as described in the above descriptions.

Figure 5:
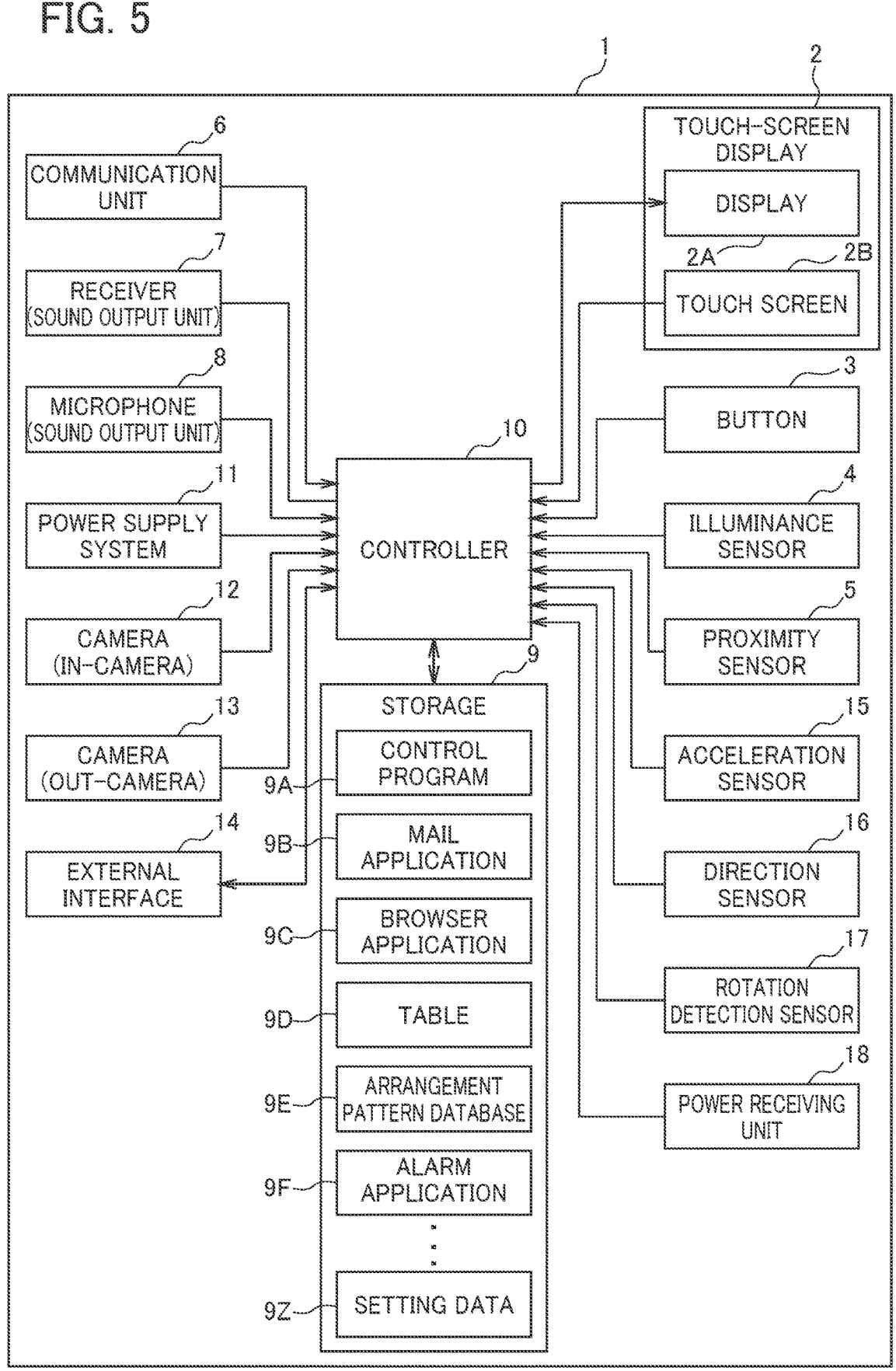
FIG. 5 is a block diagram showing functions of the smartphone according to the embodiment.

FIG. 5 is a block diagram showing a configuration of the smartphone 1. The smartphone 1 has the touch-screen display 2 as an operation unit, the button 3, the illuminance sensor 4, the proximity sensor 5, a communication unit 6, the receiver 7 as a notification unit, the microphone 8, a storage 9, a controller 10 as a control unit, cameras 12 and 13, an external interface 14, an acceleration sensor 15, a direction sensor 16, a rotation detection sensor 17, a power receiving unit 18, and a vibrating motor 19.

As described above, the touch-screen display 2 has the display 2A and the touch screen 2B. The display 2A displays characters, images, symbols, graphics or the like. The touch screen 2B detects a gesture.

The button 3 is operated by the user. The button 3 has the buttons 3A to 3F. The controller 10 collaborates with the button 3 to detect an operation of the button. The operation of the button is, for example, a click, a double click, a push, and a multi-push.

For example, the buttons 3A to 3C are a home button, a back button or a menu button. For example, the button 3D is a power on/off button of the smartphone 1. The button 3D may also serve as a sleep/wake-up button. For example, the buttons 3E and 3F are volume buttons.

The illuminance sensor 4 detects illuminance. For example, the illuminance is intensity, brightness, brilliance, etc. of light. For example, the illuminance sensor 4 is used for adjusting the brilliance of the display 2A.

The proximity sensor 5 detects presence of a proximate object in a contactless manner. The proximity sensor 5 detects, for example, a face being brought close to the touch-screen display 2.

The communication unit 6 performs wireless communication. Communication methods implemented by the communication unit 6 are wireless communication standards. For example, the wireless communication standards include cellular phone communication standards such as 2G, 3G and 4G. For example, the cellular phone communication standards include LTE (Long Term Evolution), W-CDMA, CDMA2000, PDC, GSM, PHS (Personal Handy-phone System), etc. For example, the wireless communication standards include WiMAX (Worldwide Interoperability for Microwave Access), IEEE 802.11, Bluetooth (registered trademark), IrDA, NFC (Near Field Communication), etc. Communication unit 6 may support one or more of the communication standards described above.

When a sound signal is transmitted from the controller 10, the receiver 7 outputs the sound signal as sound. The microphone 8 converts sound such as the user's voice into a sound signal, and transmits the sound signal to the controller 10. The smartphone 1 may further have a speaker(s) in addition to the receiver 7. The smartphone 1 may further have a speaker(s) in place of the receiver 7.

The storage 9 stores programs and data. The storage 9 is also utilized as a working area for temporarily storing processing results of the controller 10. The storage 9 may include an arbitrary storage device such as a semi-conductor storage device and a magnetic storage device. The storage 9 may include several types of storage devices. The storage 9 may include combination of a portable storage medium such as a memory card with a reader for the storage medium.

The programs stored in the storage 9 include: applications that are executed in the foreground or the background; and a control program that assists operations of the applications. For example, an application causes the display 2A to display a predetermined screen, and causes the controller 10 to execute processing in accordance with a gesture detected by the touch screen 2B. The control program is, for example, an OS. The applications and the control program may be installed in the storage 9 via wireless communication by the communication unit 6 or via a storage medium.

The storage 9 stores, for example, a control program 9A, a mail application 9B, a browser application 9C, and setting data 9Z. The mail application 9B provides electric mail functions of creating, transmitting, receiving and displaying electric mail. The browser application 9C provides a web browsing function of displaying web pages. A table 9D stores various tables such as a key assignment table. An arrangement pattern database 9E stores patterns of arrangement such as arrangement of icons displayed on the display 2A. The setting data 9Z provides various set-up functions regarding operations of the smartphone 1.

The control program 9A provides functions regarding a variety of control for operating the smartphone 1. For example, the control program 9A implements a telephone call function by controlling the communication unit 6, the receiver 7, the microphone 8, etc. The functions provided by the control program 9A include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 is, for example, a CPU (Central Processing Unit). The controller 10 may be an integrated circuit such as an SoC (System-on-a-chip) that integrates other constituent elements such as the communication unit 6. The controller 10 comprehensively controls the operations of the smartphone 1 to implement various functions.

More specifically, the controller 10 implements various functions by referring to data stored in the storage 9 as necessary, executing instructions included in a program stored in the storage 9, and controlling the display 2A, the communication unit 6, etc. The controller 10 may change the control in accordance with a result of detection by various detecting units such as the touch screen 2B, the button 3 and the acceleration sensor 15.

For example, the controller 10 executes the control program 9A to execute a variety of control such as changing the information displayed on the display 2A in accordance with a gesture detected via the touch screen 2B.

The camera 12 is an in-camera that photographs an object from a side of the front face 1A. The camera 13 is an out-camera that photographs an object from a side of the back face 1B.

The external interface 14 is a terminal, to which another device is connected. The external interface 14 may be a universal terminal such as USB (Universal Serial Bus), HDMI (High-Definition Multimedia Interface), Light Peak (Thunderbolt), and an earpiece-microphone connector. The external interface 14 may be a terminal designed for exclusive use, such as a Dock connector. A device that is connected to the external interface 14 includes, for example, an external storage, a speaker, and a communication device.

The acceleration sensor 15 detects a direction and level of acceleration that acts on the smartphone 1. The direction sensor 16 detects an orientation of geomagnetism. The rotation detection sensor 17 detects rotation of the smartphone 1. Results of such detection by the acceleration sensor 15, the direction sensor 16 and the rotation detection sensor 17 are utilized in combination to detect change in the position and posture of the smartphone 1.

The power receiving unit 18 does not have any electric contact with a charging surface of the battery charger including one or a plurality of coils, and receives electromagnetic waves in a predetermined frequency (for example, 100 kHz) from the battery charger. The battery charger supplies electromagnetic waves to the power receiving unit 18 that receives power therefrom by utilizing electromagnetic induction. When electromagnetic waves are supplied, the power receiving unit 18 converts the electromagnetic waves into power, and charges a battery (not shown) with the power. For example, in a case in which the battery is fully charged, the power receiving unit 18 converts the electromagnetic waves from the battery charger into power, and supplies the power to the controller 10.

The vibrating motor 19 is a motor with a weight that is attached to a tip of a motor axis. The weight is attached such that the barycenter deviates from the center of the motor axis. When the vibrating motor 19 rotates, vibration is generated due to the barycenter imbalanced by the weight, and the smartphone 1 is vibrated by the vibration. The vibrating motor 19 is used for notifications such as, for example, a notification of an incoming call or arriving mail.

By restricting functions while charging, the smartphone 1 as thus constituted can be prevented from being taken away by another person while charging. Descriptions are hereinafter provided for a specific configuration.

Figure 6:
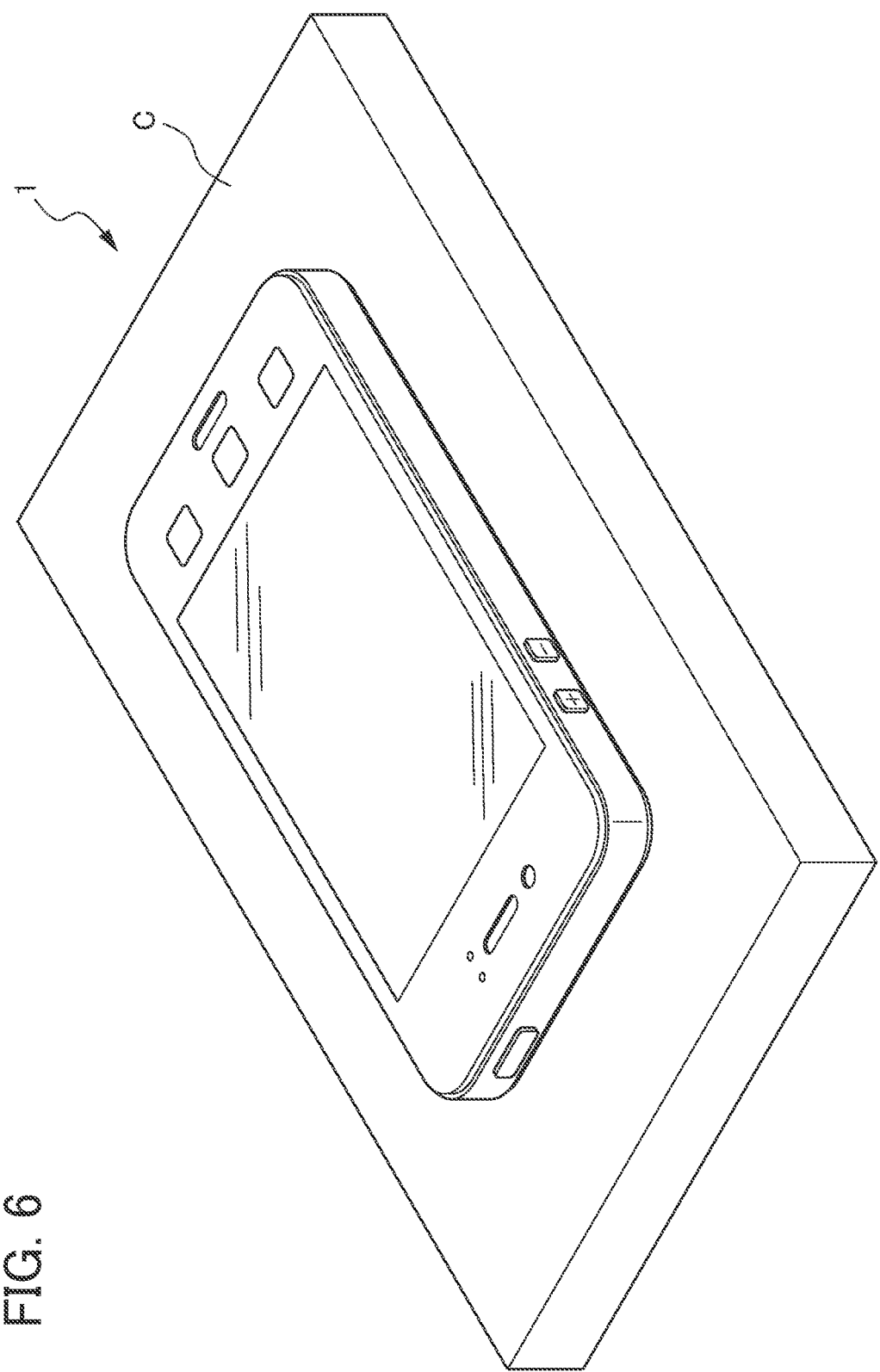
FIG. 6 is a diagram showing a state where the smartphone according to the embodiment is being charged.

FIG. 6 is a diagram showing a state where the smartphone 1 is being charged. As shown in FIG. 6, the smartphone 1 is placed on a charging surface of the battery charger C. In this case, when electromagnetic waves are supplied from the battery charger C, the power receiving unit 18 converts the electromagnetic waves from the battery charger into power, and supplies the electromagnetic waves to the battery or the controller 10.

As shown in FIG. 6, in a state where the battery charger C is supplying electromagnetic waves to the power receiving unit 18, in a case in which the electromagnetic waves are no longer supplied due to separation of the smartphone 1 from the battery charger C, the controller 10 restricts execution of predetermined functions. The controller 10 causes the touch-screen display 2 to display, for example, an authentication screen for requesting an input of a password, and accepts an input of authentication information such as a password. After the controller 10 restricts execution of the predetermined functions, when an authentication operation such as an input of a password is performed via the touch-screen display 2, a home screen is displayed to enable the predetermined functions to be executed.

Here, in a case in which the acceleration sensor 15 detects acceleration of at least a predetermined value, the controller 10 determines that the smartphone 1 is separated from the battery charger C. The controller 10 may also determine that the smartphone 1 is separated from the battery charger C, in a case in which a direction detected by the direction sensor 16 changes, or a case in which electromagnetic waves for the charging are no longer received from the battery charger C, or a case in which an angular velocity detected by the rotation detection sensor 17 changes. The controller 10 may also determine that the smartphone 1 is separated from the battery charger C, by combining values detected by the acceleration sensor 15, the direction sensor 16 and the rotation detection sensor 17.

The controller 10 may also determine that the smartphone 1 is separated from the battery charger C, based on change in positional information of the smartphone 1. In this case, the controller 10 identifies a position of the smartphone 1 by utilizing a GPS system or base stations to obtain positional information indicating the position of the smartphone 1.

The predetermined functions refer to functions executed by applications activated by tapping icons such as, for example, mail and phone icons arranged on the home screen. More specifically, in a case in which execution of the predetermined functions is restricted, the controller 10 accepts an operation of inputting authentication information, but does not accept any operation of activating these applications. In this case, the controller 10 executes control so as not to display the home screen on the touch-screen display 2. In the following descriptions in the present embodiment, performing an authentication operation refers to performing an operation of inputting a correct password stored in advance in the storage 9 or the like, and does not refer to a case of failing in authentication. Examples of an authentic method include password authentication, voice authentication, authentication by a track of touch to the touch-screen display 2, and the like.

Therefore, since the smartphone 1 restricts predetermined functions while charging, even if the smartphone 1 is taken away by a third party who does not know authentication information such as a password, the predetermined functions cannot be executed. In general, the purpose of a third party who takes away the smartphone 1 is likely to execute such predetermined functions of the smartphone 1. Thus, by restricting predetermined functions while charging, it is possible to prevent the smartphone 1 from being taken away by another person while charging.

Although the configuration and operations of the smartphone 1 have been described above, the smartphone 1 is not limited thereto, and may include each constituent element configured as a method and program for improving the operability.

In a state where the battery charger C is supplying electromagnetic waves to the power receiving unit 18, the controller 10 determines whether the battery charger C is a predetermined battery charger. In a case in which the controller 10 determines that the battery charger C is the predetermined battery charger, when the electromagnetic waves are no longer supplied due to separation from the battery charger C, the controller 10 restricts execution of predetermined functions, and accepts an authentication operation.

The controller 10 stores a list of identification information of battery chargers other than the predetermined battery charger in the storage 9 in advance. By communicating with the battery charger C, the controller 10 receives identification information of a battery charger from the battery charger C. By determining whether the identification information thus received is included in the list of identification information of battery chargers other than the predetermined battery charger, the controller 10 determines whether the battery charger C is the predetermined battery charger. For example, amplitude shift keying communication in a frequency of 1 MHz is used as communication between the controller 10 and the battery charger C.

Therefore, battery chargers other than the battery chargers disposed in places such as the use's home, school and working places can be registered as predetermined battery chargers, and the smartphone 1 can accept an input of authentication information only in the predetermined battery chargers. Thus, the smartphone 1 can accept an input of authentication, only in a case in which the smartphone 1 is charged by a battery charger C disposed in a public place.

In the above descriptions, the controller 10 communicates with the battery charger C to determine whether the battery charger C is a predetermined battery charger, but the determination is not limited thereto. For example, the controller 10 may use positional information to determine whether the battery charger C is a predetermined battery charger. In such a configuration, the storage 9 stores a list in advance which describes positional information of disposing the battery chargers other than the predetermined battery chargers. In a case in which the battery charger C starts charging, the controller 10 may determine whether the battery charger C is a predetermined battery charger, by obtaining positional information of the smartphone 1, and cross-checking the positional information thus obtained with the positional information described in the list. In this case, as described above, the controller 10 obtains positional information indicating the position of the smartphone 1, by utilizing a GPS system or base stations. As a result, the controller 10 identifies the position of the smartphone 1.

In a case in which an authentication operation is not performed within a predetermined period of time from the time of restricting execution of the predetermined functions, the controller 10 causes the receiver 7 to output an audible tone to notify that the smartphone 1 is separated. The predetermined period of time is, for example, 10 seconds.

Therefore, even in a case in which the user is away, the smartphone 1 can notify the user of the fact that the smartphone 1 is separated from the battery charger C, by outputting an audible tone. Since such an audible tone can alert people around the smartphone 1, the smartphone 1 can be consequently prevented from being taken away by another person while charging.

In the above descriptions, the controller 10 causes the receiver 7 to notify that the smartphone 1 is separated, but the notification is not limited thereto. For example, in a case in which an authentication operation is not performed within a predetermined period of time from the time of restricting execution of the predetermined functions, the controller 10 may notify that the smartphone 1 is separated, by causing the touch-screen display 2 to display an image indicating that the smartphone 1 is separated.

In the above descriptions, the controller 10 causes the receiver 7 to notify that the smartphone 1 is separated, in a case in which an authentication operation is not performed within a predetermined period of time from the time of restricting execution of the predetermined functions, but the notification is not limited thereto. In a state where the battery charger C is supplying electromagnetic waves to the power receiving unit 18, in a case in which the electromagnetic waves are no longer supplied due to separation from the battery charger C, the controller 10 may cause the receiver 7 to make a notification. In this case, in a state where the battery charger C is supplying the electromagnetic waves to the power receiving unit 18, the controller 10 accepts an authentication operation via the touch-screen display 2. In this way, the smartphone 1 can cause the receiver 7 to make a notification immediately when the smartphone 1 is separated.

In a case in which the battery charger C starts supplying electromagnetic waves to the power receiving unit 18, the controller 10 suspends the vibrating function of the vibrating motor 19. As a result, in a state where the battery charger C is supplying electromagnetic waves to the power receiving unit 18, the controller 10 suspends the vibrating function of the vibrating motor 19.

For example, the smartphone 1 may be set to a silent mode, in which the vibrating motor 19 is driven when there is an incoming call. In such a case, since the smartphone 1 controls the vibrating motor 19 to be not vibrated in a case in which the smartphone 1 is placed on the battery charger C, it is possible to prevent the smartphone 1 from falling off the battery charger C due to vibration of the vibrating motor 19.

In a case in which the smartphone 1 is placed on the battery charger C, the controller 10 may suspend the vibrating function of the vibrating motor 19, and may also cause the receiver 7 to output sound in place of the vibrating function. For example, in a case in which the smartphone 1 in the silent mode is placed on the battery charger C, the controller 10 may temporarily cancel the silent mode and cause the receiver 7 to make a notification when there is an incoming call.

In a state where the battery charger C is supplying electromagnetic waves to the power receiving unit 18, in a case in which the electromagnetic waves are no longer supplied due to separation from the battery charger C, the controller 10 causes the touch-screen display 2 to display countdown for a predetermined period of time as an initial value. In a case in which the battery charger starts supplying electromagnetic waves to the power receiving unit 18 during the countdown, the controller 10 suspends the countdown. The predetermined period of time is synchronized with a predetermined period of time, which is for the receiver 7 to output an audible tone in a case in which an authentication operation is not performed within the predetermined period of time.

Therefore, by displaying the countdown, the smartphone 1 can make a third party recognize that the time is limited for authentication to be accepted. As a result, since the third party can recognize that the predetermined functions are disabled, the third party recognizes that it is impossible to achieve the purpose of taking away the smartphone 1 for use.

Thus, by displaying countdown for a predetermined period of time as an initial value, it is possible to prevent the smartphone 1 from being taken away by another person while charging.

After the controller 10 suspends the countdown display, in a case in which the electromagnetic waves are no longer supplied due to separation from the battery charger C again, countdown is display afresh on the touch-screen display 2 for a predetermined period of time as an initial value. More specifically, in a case in which the smartphone 1 is returned to the battery charger C, the controller 10 resets the display of countdown to an initial value.

Therefore, even in a case in which the user failed in authentication, it is possible to prevent the predetermined functions from being disabled, as long as the user returns the smartphone 1 to the battery charger C.

Figure 7:
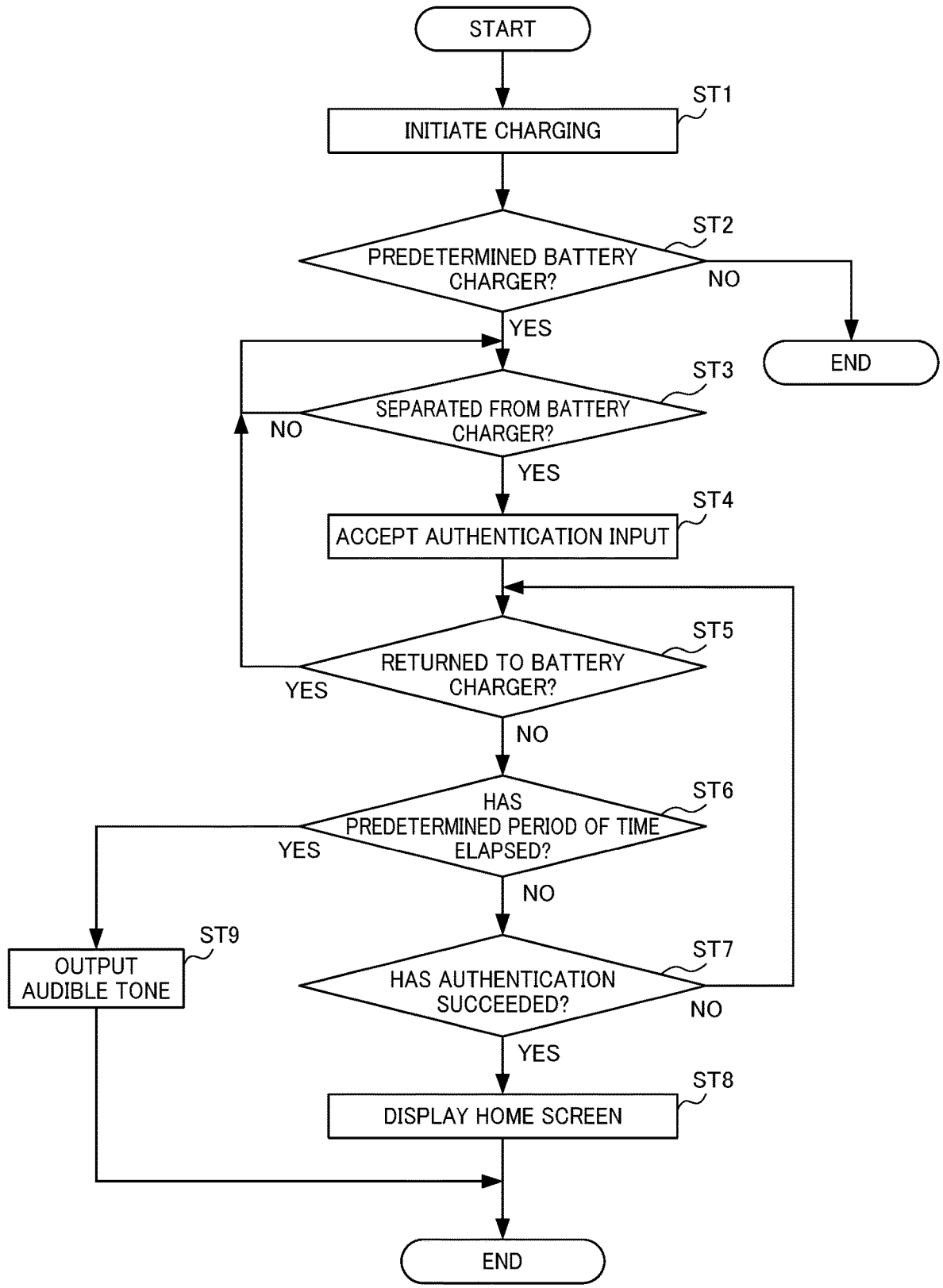
FIG. 7 is a flowchart showing a flow of processing when the smartphone according to the embodiment is charged.

Next, with reference to a flowchart shown in FIG. 7, descriptions are provided for a flow of processing when the smartphone 1 is charged.

In Step ST1, when the smartphone 1 is placed on the battery charger C, the power receiving unit 18 receives electromagnetic waves that are supplied from the battery charger C, and the charging is initiated. In Step ST2, the controller 10 determines whether the battery charger C, on which the smartphone 1 is placed, is a predetermined battery charger. More specifically, the controller 10 communicates with the battery charger C to determine whether the battery charger C is the predetermined battery charger. In a case in which the determination is YES, the controller 10 advances the processing to Step ST3. In a case in which the determination is NO, the controller 10 terminates the present flow of processing.

In Step ST3, the controller 10 determines whether the smartphone 1 is separated from the battery charger C. In a case in which the determination is YES, the controller 10 advances the processing to Step ST4. In a case in which the determination is NO, the controller 10 repeats the processing in Step ST3.

In Step ST4, the controller 10 causes the touch-screen display 2 to display an authentication screen, and accepts an input of authentication information. The controller 10 causes the touch-screen display 2 to display countdown for a predetermined period of time as an initial value. The controller 10 controls the touch-screen display 2 to not display a home screen, thereby restricting use of predetermined functions. That is, the controller 10 does not allow the predetermined functions to be used.

In Step ST5, the controller 10 determines whether the smartphone 1 is returned to the battery charger C. In a case in which the determination is YES, the controller 10 returns the processing to Step ST3. In a case in which the determination is NO, the controller 10 advances the processing to Step ST6.

In Step ST6, the controller 10 determines whether the predetermined period of time has elapsed since the authentication screen was displayed on the touch-screen display 2. In a case in which the determination is YES, the controller 10 advances the processing to Step ST9. In a case in which the determination is NO, the controller 10 advances the processing to Step ST7.

In Step ST7, the controller 10 verifies the authentication information that was input in the authentication screen displayed in Step ST4, and determines whether the authentication succeeded. In a case in which the determination is YES, the controller 10 advances the processing to Step ST8. In a case in which the determination is NO, the controller 10 returns the processing to Step ST5.

In Step ST8, the controller 10 causes the touch-screen display 2 to display the home screen, and cancels the restriction of using the predetermined functions. When the processing in Step ST8 is completed, the controller 10 terminates the present flow of processing.

In Step ST9, the controller 10 causes the receiver 7 to output an audible tone. When the processing in Step ST9 is completed, the controller 10 terminates the present flow of processing. In this case, since the home screen is not displayed on the touch-screen display 2, the state of restricting the predetermined functions is maintained.

Therefore, the smartphone 1 restricts predetermined functions while charging. The smartphone 1 maintains the state of restricting the predetermined functions unless authentication succeeds. As a result, since the smartphone 1 can deprive a third party of motivation to use the predetermined functions, it is possible to prevent the smartphone 1 from being taken away by another person while charging.

A part or all of the programs stored in the storage 9 as described in FIG. 5 may be downloaded from other devices via wireless communication by the communication unit 6. A part or all of the programs stored in the storage 9 as described in FIG. 5 may be stored in a storage medium that is readable by a reader included in the storage 9. A part or all of the programs stored in the storage 9 as described in FIG. 5 may be stored in a storage medium such as a CD, a DVD or a Blu-ray that is readable by a reader connected to the external interface 14.

The configuration of the smartphone 1 shown in FIG. 5 is an example, and may be altered as appropriate within the scope without departing from the spirit of the present invention. For example, the number and type of the button(s) 3 are not limited to the example shown in FIG. 5. For example, the smartphone 1 may include buttons with a numeric keypad layout or a QWERTY keyboard layout, in place of the buttons 3A to 3C, as buttons for operations regarding screens. The smartphone 1 may include only a single button and may not include any button, for operations regarding screens. In the example shown in FIG. 5, the smartphone 1 includes two cameras, but the smartphone 1 may include only a single camera, and may not include any camera. In the example shown in FIG. 5, the smartphone 1 includes three types of sensors for detecting the position and posture, but the smartphone 1 may not include some of these sensors, and may include other types of sensors for detecting the position and posture. The illuminance sensor 4 and the proximity sensor 5 may be configured as a single sensor instead of separate sensors.

A characteristic embodiment has been described for the purpose of completely and clearly disclosing the present invention. However, the invention according to the attached claims should not be limited to the above embodiment, and the invention should be configured to embody all modifications and substitutable configurations that can be created by a person skilled in the art within the scope of the basic matter described herein.

For example, each program shown in FIG. 5 may be divided into a plurality of modules, and may be coupled with other programs.

In the above embodiment, the smartphone has been described as an example of the portable electronic device, but the portable electronic device according to the attached claims is not limited to a smartphone. For example, the portable electronic device according to the attached claims may be any portable electronic device including a power receiving unit that receives electromagnetic waves that are supplied from a battery charger by electromagnetic induction, and may be a portable electronic device such as a mobile phone, a portable personal computer, a digital camera, a media player, an electronic book reader, a navigator or a gaming machine.

What is claimed is:

1. A portable electronic device, comprising:
an operation unit;
a notification unit including a speaker;
a power receiving unit configured to receive power from electromagnetic waves that are supplied from a battery charger; and
a control unit configured to cause the speaker to make a sound notification in response to a determination that the portable electronic device is separated from the battery charger, in a state where the battery charger is supplying the electromagnetic waves to the power receiving unit.

2. The portable electronic device according to claim 1, wherein
the operation unit is defined by a touch-screen display, and
the control unit is configured to, in the state where the battery charger is supplying the electromagnetic waves to provide charging power to the power receiving unit, cause the notification unit to make the sound notification, in response to the determination that the portable electronic device is separated from the battery charger and the electromagnetic waves are no longer supplied from the battery charger, and
accept an authentication operation by a user's input via the operation unit.

3. The portable electronic device according to claim 2, wherein,
the control unit is configured to
restrict execution of predetermined functions when the portable electronic device is separated from the battery charger in the state where the battery charger is supplying the electromagnetic waves to provide the charging power to the power receiving unit, and
cause the speaker to make the sound notification when the authentication operation is not performed within a predetermined period of time after restricting the execution of the predetermined functions.

4. The portable electronic device according to claim 3, wherein, in the state where the battery charger is supplying the electromagnetic waves to provide the charging power to the power receiving unit, in a case in which the portable electronic device is separated from the battery charger, the control unit is configured to cause the touch-screen display to display the predetermined period of time.

5. The portable electronic device according to claim 4, wherein, in the state where the battery charger is supplying the electromagnetic waves to provide the charging power to the power receiving unit, when the portable electronic device is separated from the battery charger, the control unit is configured to cause the touch screen display to display countdown for the predetermined period of time as an initial value.

6. The portable electronic device according to claim 5, wherein, in a case in which the battery charger starts again supplying the electromagnetic waves to provide the charging power to the power receiving unit while the countdown is being displayed, the control unit is configured to suspend the displaying of the countdown.

7. The portable electronic device according to claim 6, wherein, in a case in which the portable electronic device is separated from the battery charger after suspending the displaying of the countdown, the control unit is configured to cause the display unit to display countdown for the predetermined period of time as an initial value.

8. The portable electronic device according to claim 1, wherein the control unit is configured to cause the speaker to make the sound notification to prevent the portable electronic device from being taken away by another person while the battery charger is supplying the electromagnetic waves to the power receiving unit.

9. A portable electronic device, comprising:
an operation unit;
a notification unit including a receiver;
a power receiving unit configured to receive power from electromagnetic waves that are supplied from a battery charger; and
a control unit configured to cause the receiver to make a sound notification in response to a determination that the portable electronic device is separated from the battery charger, in a state where the battery charger is supplying the electromagnetic waves to the power receiving unit.

* * * * *